US012691447B2

(12) United States Patent
Mizokuchi et al.

(10) Patent No.: US 12,691,447 B2
(45) Date of Patent: Jul. 28, 2026

(54) MICRODEVICE AND MANUFACTURING METHOD FOR MICRODEVICE

(71) Applicant: TIANMA JAPAN, LTD., Kawasaki (JP)

(72) Inventors: Chikaaki Mizokuchi, Kawasaki (JP); Masanori Shirokawa, Kawasaki (JP); Sho Onose, Kawasaki (JP)

(73) Assignee: TIANMA JAPAN, LTD., Kawasaki (JP)

( * ) Notice: Subject to any disclaimer, the term of this patent is extended or adjusted under 35 U.S.C. 154(b) by 851 days.

(21) Appl. No.: 17/880,894

(22) Filed: Aug. 4, 2022

(65) Prior Publication Data

US 2023/0046061 A1 Feb. 16, 2023

(30) Foreign Application Priority Data

Aug. 11, 2021 (JP) ................................. 2021-131053

(51) Int. Cl.
*B01L 3/00* (2006.01)

(52) U.S. Cl.
CPC ... *B01L 3/502707* (2013.01); *B01L 3/502715* (2013.01); *B01L 2200/0689* (2013.01); *B01L 2300/0816* (2013.01); *B01L 2300/0887* (2013.01); *B01L 2300/12* (2013.01); *B01L 2300/123* (2013.01); *B01L 2400/049* (2013.01)

(58) Field of Classification Search
CPC ......... B01L 3/502707; B01L 3/502715; B01L 2200/0689; B01L 2300/0816; B01L 2300/0887; B01L 2300/12; B01L 2300/123; B01L 2400/049; B01L 3/5027; B01L 9/527; B01L 2200/027; G01N 27/44791
See application file for complete search history.

(56) References Cited

U.S. PATENT DOCUMENTS

| | | | | |
|---|---|---|---|---|
| 2006/0246573 | A1 | 11/2006 | Kurane et al. | |
| 2007/0048179 | A1 | 3/2007 | Fujita et al. | |
| 2013/0137169 | A1 | 5/2013 | Kojima | |
| 2015/0240289 | A1 | 8/2015 | Manage | |
| 2016/0144362 | A1* | 5/2016 | Lee | B01D 19/0031 436/175 |
| 2017/0144150 | A1* | 5/2017 | Wang | B81C 3/001 |
| 2019/0091649 | A1* | 3/2019 | Priewasser | B32B 9/045 |

(Continued)

FOREIGN PATENT DOCUMENTS

| | | | | |
|---|---|---|---|---|
| JP | 03-103765 | A | | 4/1991 |
| JP | 2005-030927 | A | | 2/2005 |
| JP | 2005249540 | A | * | 9/2005 |

(Continued)

OTHER PUBLICATIONS

Office Action issued Apr. 22, 2025 in Japanese Application No. 2021-131053.

(Continued)

*Primary Examiner* — Benjamin R Whatley
(74) *Attorney, Agent, or Firm* — Sughrue Mion, PLLC

(57) ABSTRACT

A microdevice includes a first substrate; and a second substrate that is joined to the first substrate, and that includes at least one groove that forms at least one microchannel with the first substrate and recesses that form closed spaces with the first substrate. When viewed from above, the closed spaces are disposed sandwiching the least one microchannel.

6 Claims, 5 Drawing Sheets

(56) References Cited

U.S. PATENT DOCUMENTS

2020/0094249 A1 3/2020 Chiba et al.

FOREIGN PATENT DOCUMENTS

| | | | |
|---|---|---|---|
| JP | 3918040 | B2 | 5/2007 |
| JP | 2008-212811 | A | 9/2008 |
| JP | 2013-113679 | A | 6/2013 |
| WO | 2005/026742 | A1 | 3/2005 |
| WO | 2018/180508 | A1 | 10/2018 |

OTHER PUBLICATIONS

Office Action issued Sep. 2, 2025 in Japanese Application No. 2021-131053.

* cited by examiner

MANUFACTURING METHOD FOR MICRODEVICE

↓

PREPARE FIRST SUBSTRATE — S10

↓

FORM SECOND SUBSTRATE — S20

↓

JOIN FIRST SUBSTRATE AND SECOND SUBSTRATE TO FORM MICROCHANNELS AND CLOSED SPACES — S30

↓

DEPRESSURIZE INTERIOR OF CLOSED SPACES — S40

↓

VACUUM PACKAGE FIRST SUBSTRATE AND SECOND SUBSTRATE THAT ARE JOINED AND IN WHICH CLOSED SPACES ARE IN DEPRESSURIZED STATE — S50

↓

END

MICRODEVICE AND MANUFACTURING METHOD FOR MICRODEVICE

CROSS-REFERENCE TO RELATED APPLICATION

This application claims the benefit of Japanese Patent Application No. 2021-131053, filed on Aug. 11, 2021, the entire disclosure of which is incorporated by reference herein.

FIELD

The present disclosure relates generally to a microdevice and a manufacturing method for the microdevice.

BACKGROUND

In the related art, fluorescence polarization immunoassay (FPIA) is known as an immunoassay that uses fluorescence. In FPIA, an antigen-antibody reaction is used to detect a substance to be measured. For example, Unexamined Japanese Patent Application Publication No. H03-103765 describes a method for calculating the concentration of a measurement antigen (substance to be measured) from a measured degree of polarization of fluorescence.

Additionally, microdevices that are used in the analysis of biorelated substances are known in the related art. For example, Unexamined Japanese Patent Application Publication No. 2005-30927 describes a biorelated molecule microarray in which a biorelated molecule is held between a first member and a second member, in one of the first member and the second member, grooves are formed in parallel on a contact surface to the other member, and spaces that serve as a reaction region is provided.

Typically, a substrate formed from polydimethylsiloxane (hereinafter referred to as "PDMS substrate"), and a counter substrate formed from glass, quartz, or the like are used as the substrates of a microdevice that is used in the analysis of a biorelated substance. The PDMS substrate and the quartz/glass substrate can be easily bonded together by the adsorption force of the PDMS substrate. However, when, for example, using a PDMS substrate that has been subjected to hydrophilic treatment, the adsorption force of the PDMS substrate may weaken due to the hydrophilic treatment and the solution may leak from a channel of the microdevice.

To address this problem, Japanese Patent No. 3918040 describes a microchip on which a continuous annular negative pressure channel is provided at a portion, of the PDMS substrate, near the outer peripheral edge of the adhesion surface side. This negative pressure channel is for vacuum adsorbing the PDMS substrate to the counter substrate. With the microchip of Japanese Patent No. 3918040, the bonding force between the PDMS substrate and the counter substrate is increased by evacuating/suctioning the air out of the negative pressure channel prior to using the microchip.

With the microchip of Japanese Patent No. 3918040, the air is evacuated from the single continuous negative pressure channel and, consequently, the channel may close due to atmospheric pressure and sufficient evacuation of the air may not be possible. Additionally, since the negative pressure channel is provided on the outer edge of the microchip, the PDMS substrate and the counter substrate may not be able to sufficiently join at the portions surrounding the channel and positioned at the center of the microchip. Moreover, the outer shape of the microchip becomes larger.

Furthermore, after the air is evacuated out of the negative pressure channel, the evacuation port of the negative pressure channel must be closed.

SUMMARY

A microdevice according to a first aspect of the present disclosure includes:

a first substrate;

a second substrate that is joined to the first substrate, and that includes at least one groove that forms at least one microchannel with the first substrate and recesses that form closed spaces with the first substrate, wherein when viewed from above, the closed spaces are disposed sandwiching the at least one microchannel.

A manufacturing method for a microdevice according to a second aspect of the present disclosure includes:

preparing a first substrate;

preparing a second substrate that includes at least one groove that forms at least one microchannel with the first substrate and recesses that are positioned sandwiching the at least one groove and that form closed spaces with the first substrate;

joining the first substrate and the second substrate to form the at least one microchannel and the closed spaces; and depressurizing an interior of the formed closed spaces.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a microdevice according to various embodiments is described while referencing the drawings.

Embodiment 1

A microdevice 10 according to the present embodiment is described while referencing FIGS. 1 to 7. In one example, the microdevice 10 is used in the detection of a substance to be measured using a fluorescence polarization immunoassay.

Figure 1:
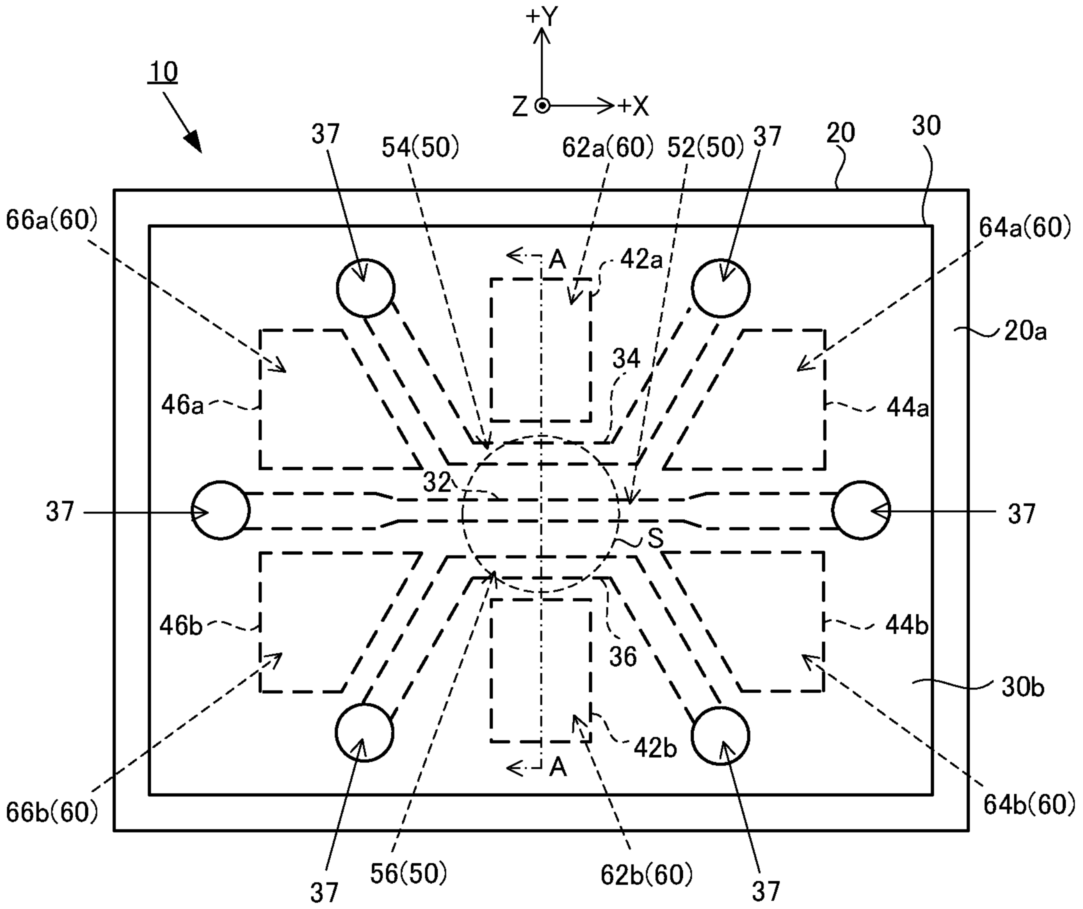
FIG. 1 is a top view illustrating a microdevice according to Embodiment 1.

As illustrated in FIG. 1, the microdevice 10 includes a first substrate 20, a second substrate 30, three microchannels 52, 54, 56, and closed spaces 62*a*, 62*b*, 64*a*, 64*b*, 66*a*, 66*b*. Note that, in the present description, to facilitate comprehension, in the microdevice 10 of FIG. 1, the right direction (the right direction on paper) is referred to as the "+X direction", the up direction (the up direction on paper) is referred to as the "+Y direction", and the direction perpendicular to the +X direction and the +Y direction (the front direction on paper) is referred to as the "+Z direction." The microchannels 52, 54, 56 are also collectively referred to as "microchannels 50", and the closed spaces 62*a* to 66*b* are also collectively referred to as "closed spaces 60."

Figure 2:
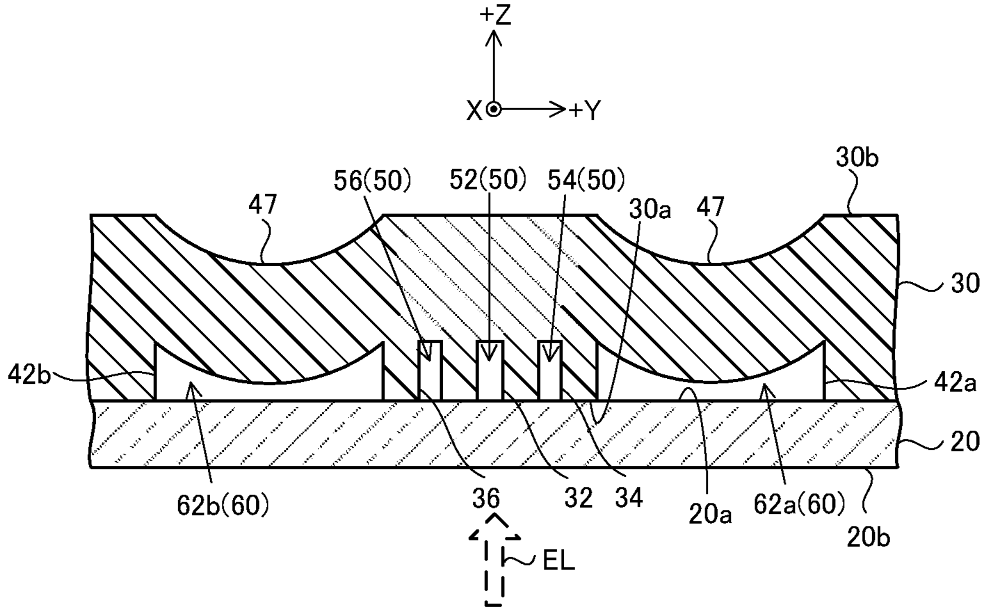
FIG. 2 is a cross-sectional view of the microdevice illustrated in FIG. 1, taken along line A-A.

The first substrate 20 of the microdevice 10 is implemented as a flat quartz glass substrate. As illustrated in FIG. 2, the first substrate 20 includes a first main surface 20*a*, and a second main surface 20*b* on the side opposite the first main surface 20*a*. The second substrate 30 is joined to the first main surface 20*a* of the first substrate 20. A measurement region S illustrated in FIG. 1 is irradiated with excitation light EL in the fluorescence polarization immunoassay. The excitation light EL is incident perpendicular to the second main surface 20*b* of the first substrate 20.

The second substrate 30 of the microdevice 10 is formed from a material that has low autofluorescence. In the present embodiment, the second substrate 30 is formed from a copolymer of carbon black-containing polydimethylsiloxane and polyethylene glycol. The second substrate 30 of the present embodiment has hydrophilicity due to the polyether groups included in the copolymer.

As illustrated in FIG. 2, the second substrate 30 includes a first main surface 30*a*, and a second main surface 30*b* on the side opposite the first main surface 30*a*. In the present embodiment, the first main surface 30*a* of the second substrate 30 is joined to the first main surface 20*a* of the first substrate 20.

Figure 3:
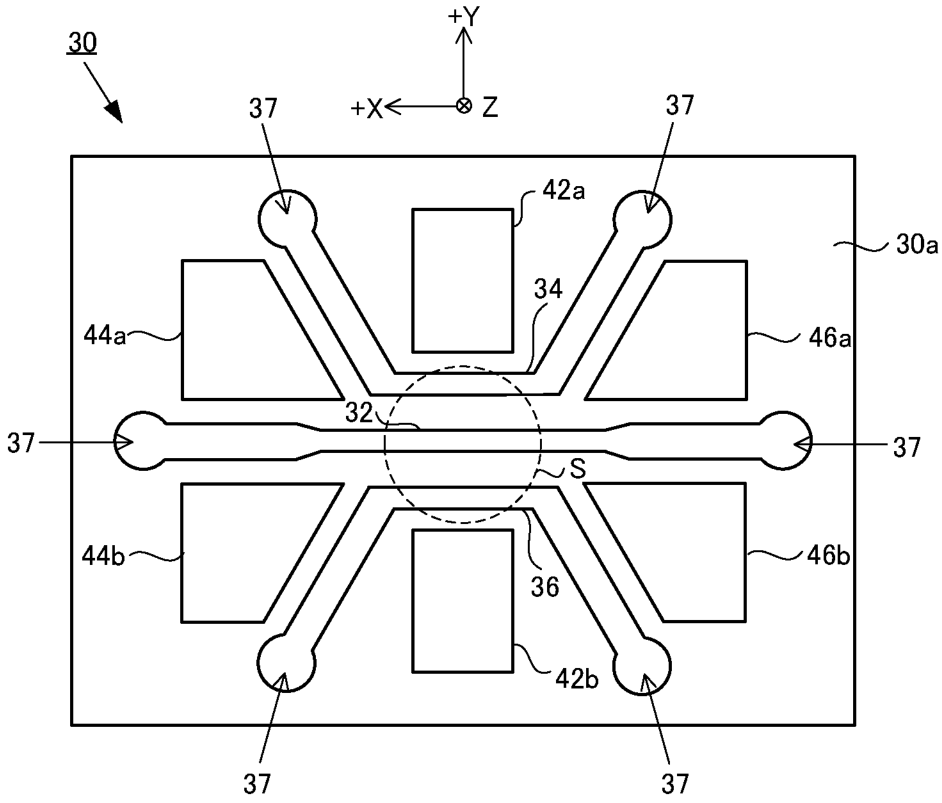
FIG. 3 is a plan view illustrating a second substrate according to Embodiment 1.

As illustrated in FIG. 3, three grooves 32, 34, 36 that form the microchannels 50 with the first substrate 20 (the first main surface 20*a*) are formed on the first main surface 30*a* of the second substrate 30. A through-hole 37 is provided at both ends of each of the grooves 32, 34, 36. The through-hole 37 corresponds to an introduction port or a discharge port of the microchannels 50. Furthermore, recesses 42*a*, 42*b*, 44*a*, 44*b*, 46*a*, 46*b* that form the closed spaces 60 with the first substrate 20 (the first main surface 20*a*) are formed on the first main surface 30*a* of the second substrate 30.

Center sections of the grooves 32, 34, 36 extend in parallel in the X direction in the measurement region S. The groove 32 is positioned in the center section of the second substrate 30 on the XY plane, and both ends of the groove 32 extend in the X direction. The groove 34 is positioned on the +Y side on the XY plane, and both ends of the groove 34 are bent toward the +Y side. The groove 36 is positioned on the −Y side on the XY plane, and both ends of the groove 36 are bent toward the −Y side.

The recess 42*a* and the recess 42*b* form a pair, and have the same shape. Additionally, the recess 42*a* and the recess 42*b* are symmetrically positioned sandwiching the grooves 32, 34, 36 in the measurement region S in the width direction of the grooves 32, 34, 36. The recess 44*a* and the recess 44*b* form a pair, and have the same shape. The recess 44*a* is positioned between the +X side end of the groove 32 and the +X side end of the groove 34, and the recess 44*b* is positioned between the +X side end of the groove 32 and the +X side end of the groove 36. The recess 44*a* and the recess 44*b* are symmetrically positioned sandwiching the groove 32 in the width direction of the groove 32. The recess 46*a* and the recess 46*b* form a pair, and have the same shape. The recess 46*a* is positioned between the −X side end of the groove 32 and the −X side end of the groove 34, and the recess 46*b* is positioned between the −X side end of the groove 32 and the −X side end of the groove 36. The recess 46*a* and the recess 46*b* are symmetrically positioned sandwiching the groove 32 in the width direction of the groove 32.

Each of the microchannels 52, 54, 56 of the microdevice 10 is formed from the first substrate 20 (the first main surface 20*a*) and each of the grooves 32, 34, 36 of the second substrate 30. As illustrated in FIG. 1, similar to the grooves 32, 34, 36, the microchannels 52, 54, 56 extend in parallel in the X direction in the measurement region S. Additionally, both ends of the microchannel 54 are bent toward the +Y side, and both ends of the microchannel 56 are bent toward the −Y side. In one example, a width (that is, a Y dimension length) of the microchannels 50 in the measurement region S is 200 μm. A solution to be measured, a calibration curve solution, or the like is introduced into the microchannels 50 or discharged from the microchannels 50 via the through-hole 37.

The calibration curve solution is used in the fluorescence polarization immunoassay to create a calibration curve (specifically, a calibration curve of the degree of polarization and the concentration of the substance to be measured). The calibration curve solution includes substances to be measured having mutually different predetermined concentrations, an antibody having a predetermined concentration, and a fluorescence-labeled derivative having a predetermined concentration. The solution to be measured is the solution that is to be measured in the fluorescence polarization immunoassay. The solution to be measured includes a substance to be measured having an unknown concentration, and an antibody and a fluorescence-labeled derivative having the same concentrations as in the calibration curve solution.

It is sufficient that the substance to be measured is a compound that is detectable in an immunoassay that uses fluorescence. Examples of the substance to be measured include antibiotics, bioactive substances, mycotoxins, and the like. Specific examples of the substance to be measured include prostaglandin E2, β-lactoglobulin, chloramphenicol, deoxynivalenol, and the like.

The antibody binds specifically to the substance to be measured due to an antigen-antibody reaction. In one example, the antibody is obtained by inoculating a host animal (for example, a mouse or a cow) with the substance to be measured, and collecting and purifying the antibodies in the blood produced by the host animal. Additionally, a commercially available antibody can be used as the antibody.

The fluorescence-labeled derivative is a derivative obtained by fluorescently labeling the substance to be measured. The fluorescence-labeled derivative completes with the antibody to bind specifically to the substance to be measured due to the antigen-antibody reaction. The fluorescence-labeled derivative can be obtained by using a known method to bind a fluorescent substance to the substance to be measured. The fluorescent substance is fluorescein or rhodamine β.

Each of the closed spaces 62*a* to 66*b* of the microdevice 10 is formed from the first substrate 20 (the first main surface 20*a*) and each of the recesses 42*a* to 46*b* of the second substrate 30.

As illustrated in FIG. 1, the closed space 62*a* and the closed space 62*b* have the same shape, and are symmetrically positioned sandwiching the microchannels 50 in the measurement region S in the width direction of the microchannels 50. In the present embodiment, the closed spaces 62*a*, 62*b* are in a depressurized state, and bottoms 47 of the recesses 42*a*, 42*b* that form the closed spaces 62*a*, 62*b* are recessed toward the first substrate 20 side (the −Z direction) due to atmospheric pressure, as illustrated in FIG. 2.

In the present embodiment, since the closed spaces 62*a*, 62*b* are depressurized, the bottoms 47 of the recesses 42*a*, 42*b* are recessed due to the atmospheric pressure, and the second substrate 30 is pressed against the first substrate 20 due to the atmospheric pressure. Accordingly, in the microdevice 10, the second substrate 30 is strongly joined to the first substrate 20 by the adsorption force of the second substrate 30 and the atmospheric pressure. Since the first substrate 20 and the second substrate 30 are strongly joined by the adsorption force of the second substrate 30 and the atmospheric pressure, the microdevice 10 can suppress liquid leakage from the microchannels 50 formed from the first substrate 20 and the grooves 32, 34, 36 of the second substrate 30. Additionally, since the closed space 62*a* and the closed space 62*b* have the same shape and are symmetrically positioned sandwiching the microchannels 50, the second substrate 30 is uniformly pressed against the first substrate 20.

The closed space 64*a* and the closed space 64*b* have the same shape, and are symmetrically positioned on the +X side sandwiching the microchannel 52, in the width direction of the microchannel 52. The closed space 66*a* and the closed space 66*b* have the same shape, and are symmetrically positioned on the −X side sandwiching the microchannel 52, in the width direction of the microchannel 52. Similar to the closed spaces 62*a*, 62*b*, the closed spaces 64*a* to 66*b* also are in a depressurized state, and the bottoms 47 of the recesses 44*a* to 46*b* are recessed toward the first substrate 20 side (the −Z direction) due to the atmospheric pressure. Accordingly, due to the closed spaces 64*a* to 66*b* being in the depressurized state, the second substrate 30 is further pressed against the first substrate 20, and the microdevice 10 can suppress liquid leakage from the microchannels 50.

Next, a width (Y direction length) of the recess 42*a* that forms the closed space 62*a* with the first substrate 20, and a thickness of the bottom 47 of the recess 42*a* are described. Note that the closed space 62*a* and the closed space 62*b* have the same shape, and are symmetrically positioned sandwiching the microchannels 50 in the measurement region S in the width direction of the microchannels 50. As such, the recess 42*b* that forms the closed space 62*b* is the same as the recess 42*a*.

Figure 4:
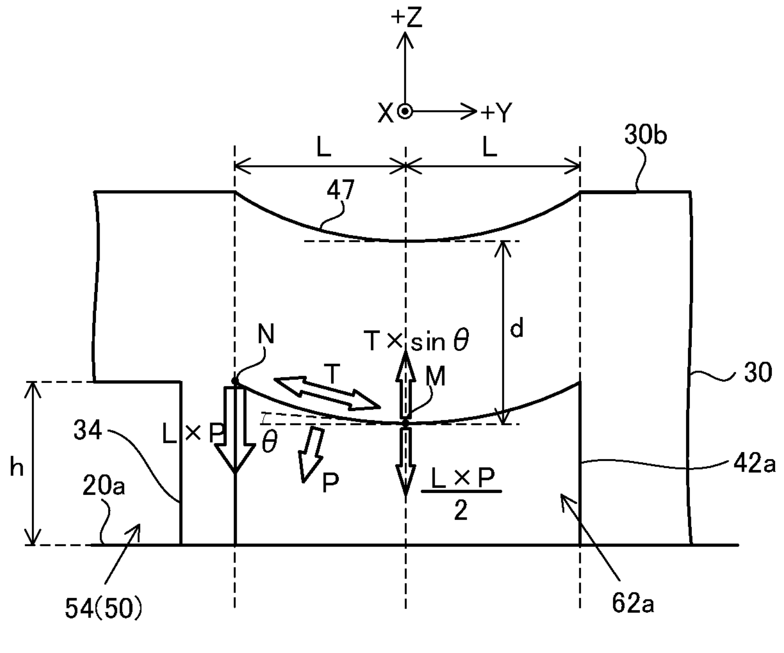
FIG. 4 is a schematic view illustrating a groove and a recess according to Embodiment 1.

As illustrated in FIG. 4, when 2×L is the width of the recess 42*a*, d is the thickness of the bottom 47 of the recess 42*a*, h is the depth (Z direction length) of the groove 34, P is the atmospheric pressure, T is tension applied to the bottom 47 of the recess 42*a*, E is the Young's modulus of the second substrate 30, and θ is an angle of the bottom 47 with respect to the first main surface 20*a* of the first substrate 20 at a midpoint M of the bottom 47, the balance of forces at the midpoint M is expressed by formula (1) below. Additionally, since a deflection c of the bottom 47 is expressed as (1/cos θ)−1, the tension T is expressed by formula (2) below. The depth h of the groove 34 is expressed by formula (3) below. Note that, at a connection point N between the bottom 47 of the recess 42*a* and a side wall of the groove 34, a force of L×P is applied in the direction (the −Z direction) of the first substrate 20, and the second substrate 30 is pressed against the first substrate 20.

$$T \times \sin\theta = \frac{L \times P}{2} \tag{1}$$

$$T = \varepsilon \times E \times d = E \times d \times \left(\frac{1}{\cos\theta} - 1\right) \tag{2}$$

$$L \times \tan\theta = h \tag{3}$$

Furthermore, formula (4) can be obtained from formulae (1) and (2), and formula (5) can be obtained from formula (3). The thickness d of the bottom 47 is expressed by formulae (4), (5), and (6).

$$d = \frac{L \times P}{2 \times E \times (\tan\theta - \sin\theta)} \tag{4}$$

$$L = \frac{h}{\tan\theta} \tag{5}$$

$$d = \frac{P \times h}{2 \times E \times (\tan\theta - \sin\theta) \times \tan\theta} \tag{6}$$

Figure 5:
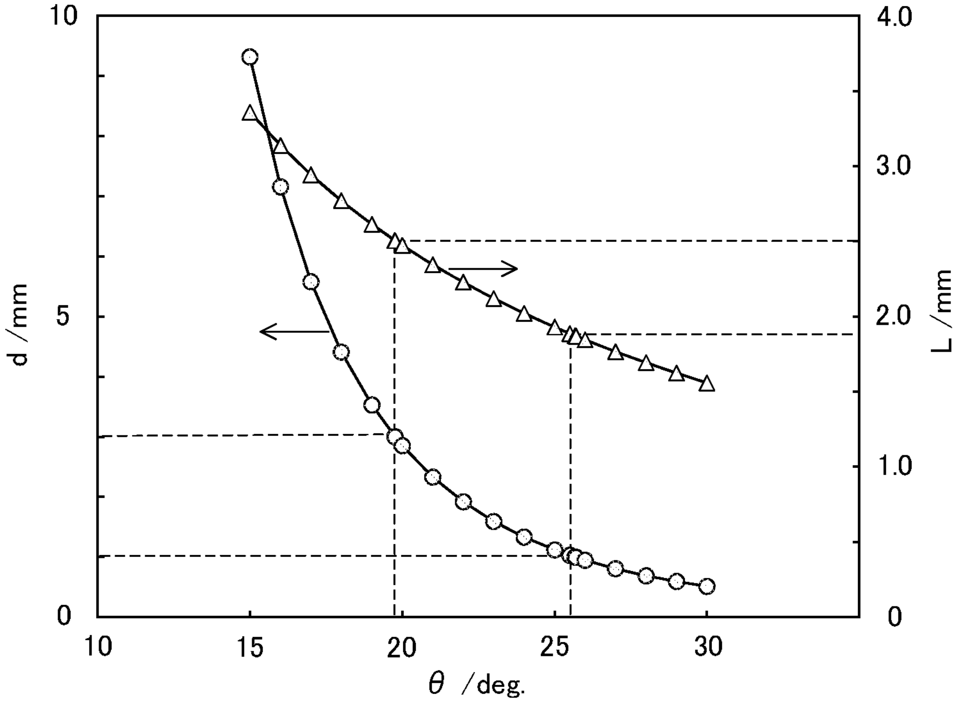
FIG. 5 is a drawing illustrating the relationship between an angle of a bottom of the recess with respect to a first main surface of a first substrate, and a thickness of the bottom of the recess and ½ a width of the recess, according to Embodiment 1.

When the atmospheric pressure P is set to 0.1013 $N/mm^2$, the Young's modulus E of the second substrate 30 is set to 2 $N/m^2$, and the depth h of the microchannels 50 is set to 0.9 mm, the relationship between the angle θ and the thickness d of the bottom 47 and L, which is ½ the width of the recess 42*a*, is expressed as in FIG. 5 from formulae (6) and (5). Generally, from the perspectives of the ease of machining of the second substrate 30, the strength of the second substrate 30, and the like, it is preferable that the thickness d of the bottom 47 be from 1 mm to 3 mm. Accordingly, it is preferable that, as illustrated in FIG. 5, L, which is ½ the width of the recess 42*a*, is from 1.9 mm to 2.5 mm, that is, the width 2×L of the recess 42*a* is from 3.8 mm to 5.0 mm.

Figure 6:
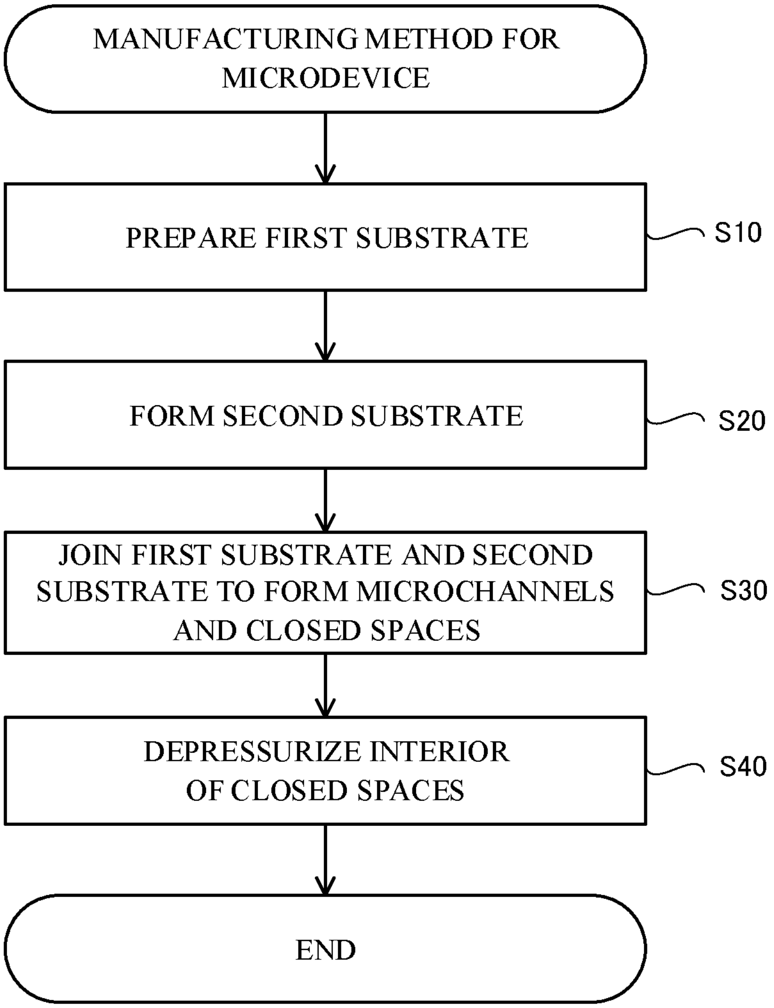
FIG. 6 is a flowchart illustrating a manufacturing method for the microdevice according to Embodiment 1.
Figure 7:
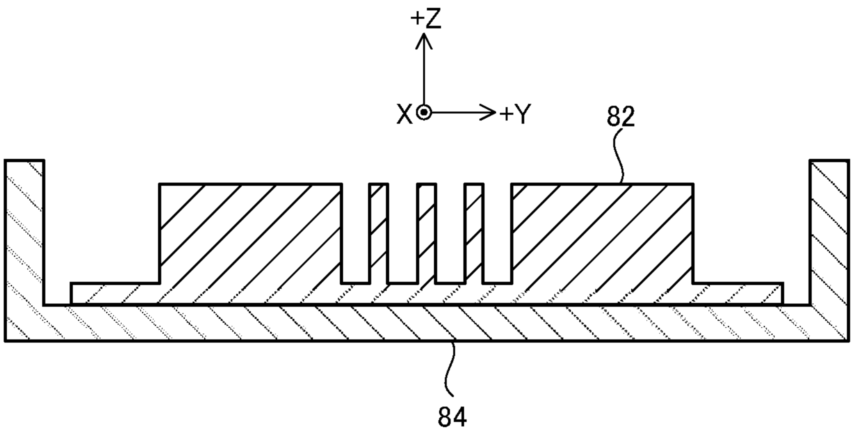
FIG. 7 is a schematic view for explaining a forming step for forming the second substrate according to Embodiment 1.

Next, a manufacturing method for the microdevice 10 is described while referencing FIGS. 6 and 7. FIG. 6 is a flowchart illustrating the manufacturing method for the microdevice 10. The manufacturing method for the microdevice 10 includes preparing the first substrate 20 (step S10); forming the second substrate 30 (step S20); joining the first substrate 20 and the second substrate 30 to form the microchannels 50 and the closed spaces 60 (step S30); and depressurizing the interior of the formed closed spaces 60 (step S40). The second substrate 30 includes the grooves 32, 34, 36 that form the microchannels 50 with the first substrate 20. Additionally, the second substrate 30 includes the recesses 42*a*, 42*b*, the recesses 44*a*, 44*b*, and the recesses 46*a*, 46*b*. The recesses 42*a*, 42*b* are symmetrically positioned sandwiching the grooves 32, 34, 36 in the measurement region S, and form the closed spaces 62*a*, 62*b* with the first substrate 20. The recesses 44*a*, 44*b* are symmetrically positioned sandwiching the +X side end of the groove 32, and form the closed spaces 64*a*, 64*b* with the first substrate 20. The recesses 46*a*, 46*b* are symmetrically positioned sandwiching the −X side end of the groove 32, and form the closed spaces 66*a*, 66*b* with the first substrate 20.

In step S10, the first substrate 20 is prepared. In the present embodiment, the first substrate 20 is implemented as a flat quartz glass substrate.

In step S20, firstly, a resin mixture containing carbon black, a polydimethylsiloxane resin, polyethylene glycol, and a curing agent is prepared. Next, as illustrated in FIG. 7, a mold 82 that corresponds to the shape of the second substrate 30 is disposed in a form 84 Then, the prepared resin mixture is poured into the form 84, and the resin mixture poured into the form 84 is cured. The cured resin mixture is released from the mold 82 and the form 84 and, then, the through-hole 37 is provided at predetermined positions of the cured resin mixture using a jig. Thus, the second substrate 30 is formed that includes the grooves 32, 34, 36 and the recesses 42*a* to 46*b* on the first main surface 30*a*, and in which the through-hole 37 is provided. Note that the mold 82 is fabricated by photolithography machining a silicon substrate.

Returning to FIG. 6, in step S30, the first substrate 20 is disposed on the first main surface 30*a* of the second substrate 30 and, then, the first substrate 20 is pressed against the second substrate 30. As a result, the first substrate 20 and the second substrate 30 are joined by the adsorption force of the second substrate 30, and the microchannels 50 and the closed spaces 60 are formed.

In step S40, firstly, the joined first substrate 20 and second substrate 30 are set in a vacuum container and the vacuum container is degassed and depressurized. As a result, the air in the closed spaces 60 escapes through slight gaps between the first substrate 20 and the second substrate 30, and the interiors of the closed spaces 60 are depressurized as well. Next, the interior of the vacuum container is returned to normal pressure, and the joined first substrate 20 and second substrate 30 are removed. When the interior of the vacuum container is returned to normal pressure, it is difficult for air to flow into the depressurized closed spaces 60 and, as such, the bottoms 47 of the recesses 42*a* to 46*b*, on which the depressurized closed spaces 60 are formed with the first substrate 20, become recessed due to the atmospheric pressure. The second substrate 30 is pressed against the first substrate 20 due to the atmospheric pressure. Accordingly, in the microdevice 10, the first substrate 20 and the second substrate 30 are strongly joined by the adsorption force of the second substrate 30 and the atmospheric pressure. Thus, the microdevice 10 can be formed.

Next, a use method of the microdevice 10 is described. In one example, the microdevice 10 is used in an immunoassay of the substance to be measured (detection of the substance to be measured).

In the immunoassay of the substance to be measured, firstly, three solutions to be measured are respectively charged into the microchannels 52, 54, 56 of the microdevice 10 using micropipettes. In the microdevice 10, the first substrate 20 and the second substrate 30 are strongly joined by the adsorption force of the second substrate 30 and the atmospheric pressure and, as such, liquid leakage of the solutions to be measured from the microchannels 50 can be suppressed. Note that, each of the three solutions to be measured includes a substance to be measured having an unknown concentration, the antibody, and the fluorescence-labeled derivative.

Next, the microdevice 10 that has been filled with the solutions to be measured is set in a device (fluorescence polarization degree measuring device) for measuring the degree of polarization of fluorescence, and the degree of polarization of the fluorescence emitted from the solutions to be measured is measured. The concentration of the substance to be measured included in the solutions to be measured can be obtained from the measured degree of polarization and a calibration curve that is created in advance.

As described above, in the microdevice 10, the closed spaces 60 are depressurized and, as such, the first substrate 20 and the second substrate 30 are strongly joined by the adsorption force of the second substrate 30 and the atmospheric pressure, and liquid leakage from the microchannels 50 can be suppressed. Additionally, the closed spaces 60 are symmetrically positioned in the width direction of the microchannels 50 and, as such, the first substrate 20 and the second substrate 30 can be uniformly joined.

Embodiment 2

Figures 8, 9:
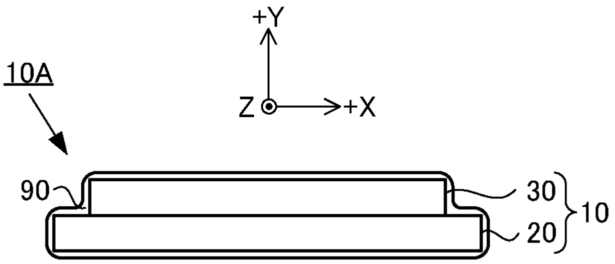
FIG. 8 is a schematic view illustrating a microdevice according to Embodiment 2.
FIG. 9 is a flowchart illustrating a manufacturing method for the microdevice according to Embodiment 2.

The microdevice 10 may be vacuum packaged (vacuum packed). As illustrated in FIG. 8, a microdevice 10A of the present embodiment includes the microdevice 10 of Embodiment 1 and a packaging 90. In the present embodiment, the microdevice 10 of Embodiment 1 (that is, the first substrate 20 and the second substrate 30 that are joined and in which the interiors of the closed spaces 60 are in a depressurized state) are vacuum packaged by the packaging 90. Next, the packaging 90 and a manufacturing method for the microdevice 10A is described.

The packaging 90 accommodates the microdevice 10 of Embodiment 1 in a state in which the interior of the microdevice 10 is depressurized, and seals the microdevice 10 of Embodiment 1. In one example, the packaging 90 is implemented as a vacuum bag that includes an outermost layer that is formed from nylon, and an innermost layer that is formed from polyethylene.

FIG. 9 is a flowchart illustrating the manufacturing method for the microdevice 10A. The manufacturing method for the microdevice 10A includes preparing the first substrate 20 (step S10); forming the second substrate 30 (step S20); joining the first substrate 20 and the second substrate 30 to form the microchannels 50 and the closed spaces 60 (step S30); depressurizing the interior of the formed closed spaces 60 (step S40); and vacuum packaging the first substrate 20 and the second substrate 30 that are joined and in which the closed spaces 60 are in a depressurized state (step S50). The preparation (step S10) to the depressurization (step S40) steps are the same as in Embodiment 1 and, as such, here, the packaging (step S50) step is described.

In step S50, firstly, the first substrate 20 and the second substrate 30 that are joined and in which the closed spaces 60 are in a depressurized state (that is, the microdevice 10 of Embodiment 1) are accommodated in the packaging 90 in which three sides are sealed, and the interior of the packaging 90 is depressurized from the one open side. After the decompressing is ended, the open side is sealed by heat sealing, and the first substrate 20 and the second substrate 30 that are joined and in which the closed spaces 60 are in a depressurized state are sealed. Thus, the microdevice 10A can be formed.

In the present embodiment, the first substrate 20 and the second substrate 30 that are joined and in which the closed spaces 60 are in a depressurized state are vacuum packaged and, as such, the depressurized state of the closed spaces 60 can be maintained for an extended period of time, and the microdevice 10 can be stored for an extended period of time. Additionally, the microdevice 10 can be readily used by simply opening the packaging 90.

MODIFIED EXAMPLES

Embodiments have been described, but various modifications can be made to the present disclosure without departing from the spirit and scope of the present disclosure.

The material of the first substrate 20 is not limited to quartz. A configuration is possible in which the first substrate 20 is formed from glass (including quartz glass), a synthetic resin, or the like that has low autofluorescence. Additionally, a configuration is possible in which the second substrate 30 does not have hydrophilicity, and is formed from a carbon black-containing polydimethylsiloxane. Furthermore, a configuration is possible in which the second substrate 30 is formed from a synthetic resin other than polydimethylsiloxane.

The second substrate 30 of Embodiment 1 has hydrophilicity due to the polyether groups of the copolymer that forms the second substrate 30. A configuration is possible in which, after the second substrate 30 is formed from carbon black-containing polydimethylsiloxane, the surface thereof is subjected to a hydrophilic treatment to impart hydrophilicity.

In Embodiment 1, the microdevice 10 includes the three microchannels 52, 54, 56, and the second substrate 30 includes the three grooves 32, 34, 36. However, the numbers of the microchannels and the grooves are not limited to three. It is sufficient that the microdevice 10 includes at least one microchannel, and that the second substrate 30 includes at least one groove.

Additionally, it is sufficient that the microdevice 10 includes the one set of closed spaces 62*a*, 62*b* symmetrically disposed sandwiching the microchannels 52, 54, 56 in the measurement region S. It is sufficient that the second substrate 30 includes the recesses 42*a*, 42*b* symmetrically disposed sandwiching the grooves 32, 34, 36 in the measurement region S.

In Embodiment 1, the closed space 62*a* and the closed space 62*b* (the recess 42*a*, and the recess 42*b*) are symmetrically positioned sandwiching the microchannels 50 (the grooves 32, 34, 36) in the measurement region S in the width direction of the microchannels 50 (the grooves 32, 34, 36). However, it is sufficient that the closed space 62*a* and the closed space 62*b* (the recess 42*a*, and the recess 42*b*) sandwich the microchannels 50 (the grooves 32, 34, 36) in the width direction of the microchannels 50 (the grooves 32, 34, 36), and the closed space 62*a* and the closed space 62*b* (the recess 42*a* and the recess 42*b*) need not be symmetrically disposed. Additionally, the closed space 64*a* and the closed space 64*b* (the recess 44*a* and the recess 44*b*), and the closed space 66*a* and the closed space 66*b* (the recess 46*a* and the recess 46*b*) need not be symmetrically disposed. That is, the closed spaces 60 (the recess 42*a* to the recess 46*b*) need not be symmetrically disposed.

Furthermore, the closed space 62*a* and the closed space 62*b* (the recess 42*a* and the recess 42*b*) are not limited to being the same shape. The closed space 64*a* and the closed space 64*b* (the recess 44*a* and the recess 44*b*), and the closed space 66*a* and the closed space 66*b* (the recess 46*a* and the recess 46*b*) are also not limited to being the same shapes.

In Embodiment 1, the closed spaces 60 of the microdevice 10 are depressurized, but the closed spaces 60 need not be depressurized. In this case, the closed spaces 60 of the microdevice 10 are depressurized before the microchannels 50 are filled with the solutions.

The microdevice 10 can be used for other uses, and is not limited to the fluorescence polarization immunoassay.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A microdevice comprising:

a first substrate; and a second substrate that is joined to the first substrate, and that includes at least one groove that forms at least one microchannel with the first substrate and recesses that form closed spaces with the first substrate, the closed spaces being independent from each other, wherein the at least one microchannel includes a hole through which a solution to be measured or a calibration curve solution is introduced into or discharged from the at least one microchannel, a first portion extending in a predetermined direction in a measurement region in which the solution to be measured or the calibration curve solution is irradiated with light, and a second portion to connect the hole to the first portion, when viewed from above, two closed spaces of the closed spaces are disposed symmetrically sandwiching the first portion, and another two closed spaces of the closed spaces are disposed symmetrically sandwiching the second portion, when viewed from above, the two closed spaces sandwiching the first portion have shapes symmetrical with respect to the first portion as a symmetry axis, and the another two closed spaces sandwiching the second portion have shapes symmetrical with respect to the second portion as a symmetry axis, and each of the closed spaces in a depressurized state causes the first substrate and the second substrate to be joined and each of the closed spaces is devoid of a hole for depressurization.

2. The microdevice according to claim 1, further comprising:

a packaging, wherein the first substrate and the second substrate are vacuum packaged by the packaging.

3. The microdevice according to claim 1, wherein a length, in a width direction of the microchannel, of one recess of the recesses is from 3.8 mm to 5 mm.

4. The microdevice according to claim 1, wherein the first substrate is formed from a glass that has low autofluorescence, and the second substrate is formed from polydimethylsiloxane.

5. A manufacturing method for the microdevice according to claim 1, the manufacturing method comprising:

preparing the first substrate;

preparing the second substrate that includes at least one groove that forms at least one microchannel with the first substrate and recesses that are positioned sandwiching the at least one groove and that form closed spaces with the first substrate;

joining the first substrate and the second substrate to form the at least one microchannel and the closed spaces; and depressurizing an interior of the formed closed spaces.

6. The manufacturing method according to claim 5, further comprising:

vacuum packaging the first substrate and the second substrate that are joined and in which the closed spaces are in the depressurized state.

* * * * *